(12) United States Patent
Iwabuchi et al.

(10) Patent No.: US 7,570,673 B2
(45) Date of Patent: Aug. 4, 2009

(54) ADM DEVICE AND SIGNAL TRANSMISSION METHOD

(75) Inventors: Noboru Iwabuchi, Kawasaki (JP); Takashi Okuda, Kawasaki (JP); Koichi Saiki, Kawasaki (JP); Youichi Konuma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 575 days.

(21) Appl. No.: 11/168,377

(22) Filed: Jun. 29, 2005

(65) Prior Publication Data
US 2006/0209861 A1 Sep. 21, 2006

(30) Foreign Application Priority Data
Mar. 18, 2005 (JP) .............................. 2005-078776

(51) Int. Cl.
*H04L 1/00* (2006.01)

(52) U.S. Cl. ...................................... 370/535; 370/235
(58) Field of Classification Search ......... 370/252–253, 370/535, 537–541, 229–236.2, 389, 392
See application file for complete search history.

(56) References Cited

U.S. PATENT DOCUMENTS

| | | | |
|---|---|---|---|
| 2002/0176356 A1* | 11/2002 | Courtney et al. | 370/216 |
| 2003/0043861 A1* | 3/2003 | Saito | 370/539 |
| 2004/0120362 A1* | 6/2004 | Chohan et al. | 370/907 |
| 2005/0147106 A1* | 7/2005 | Sonoda | 370/395.51 |

FOREIGN PATENT DOCUMENTS

JP 2002-359627 12/2002

* cited by examiner

*Primary Examiner*—Ricky Ngo
*Assistant Examiner*—Pao Sinkantarakorn
(74) *Attorney, Agent, or Firm*—Fujitsu Patent Center

(57) ABSTRACT

An ADM device which is capable of performing LCAS functions, configures a first communication network, and is connected to another ADM device which is connected to a second communication network, comprising an SDH interface for connecting to the other ADM device by SDH connection, an H4 byte monitoring means for monitoring the H4 byte of POH in the SDH interface, an LCAS control information acquisition means for acquiring LCAS control information from the H4 byte monitored by the H4 byte monitoring means, and an LCAS control information transmission means for transmitting LCAS control information acquired by the LCAS control information acquisition means to the other ADM devices, thereby providing an ADM device and signal transmission method which comprises a function for efficiently handling sharp variations in traffic, promotes work efficiency of transmission capacity increase/decrease speed within ADM systems, and actualizes the facilitation of management.

9 Claims, 7 Drawing Sheets

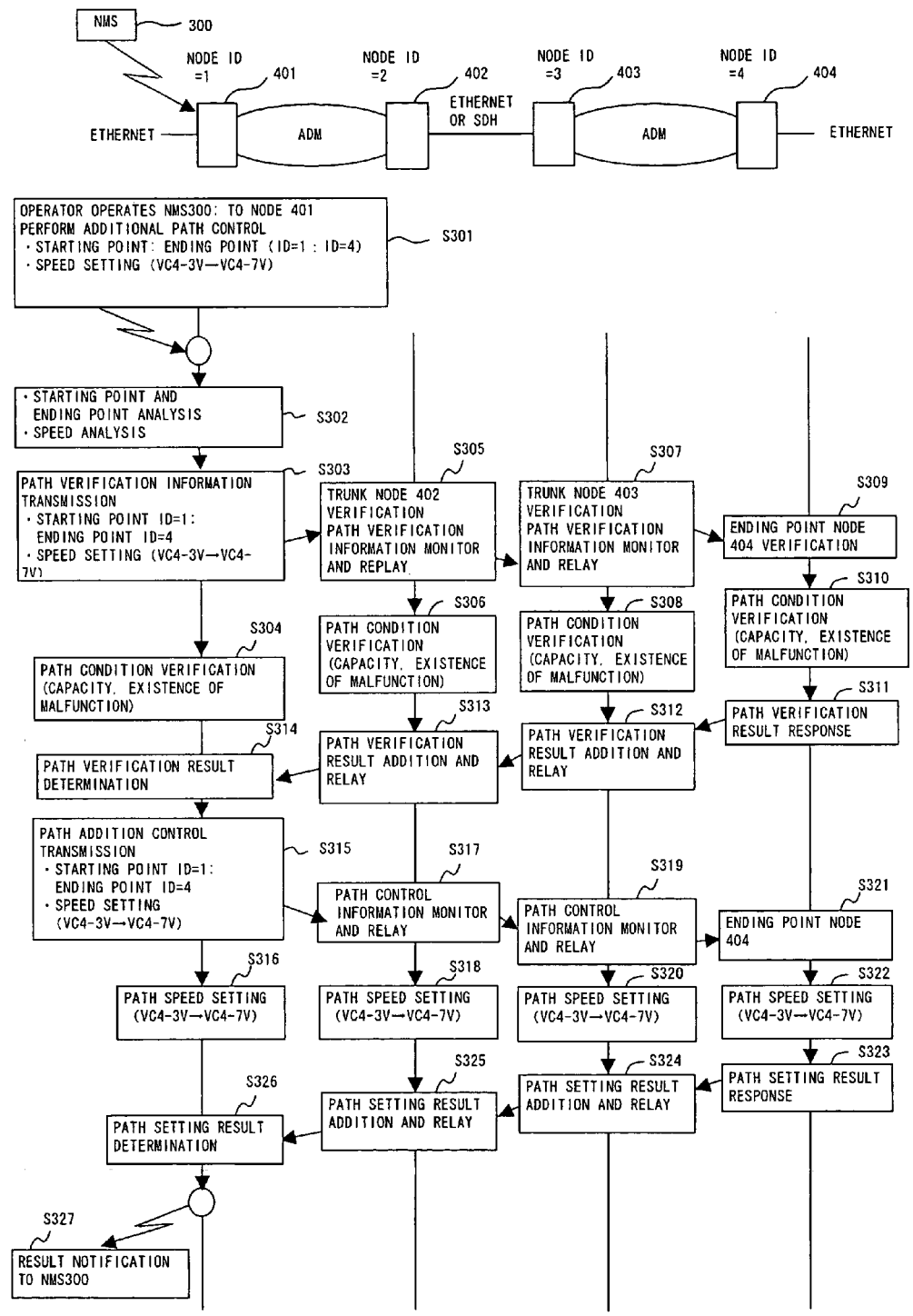
F I G. 3

|  |  | BIT | |
|---|---|---|---|
|  |  | b0~b1 | b4~b7 |
| MULTIFRAME | 1 | | |
| | 2 | | |
| | 3 | | |
| | 4 | | |
| | 5 | | Reserve |
| | 6 | | Reserve |
| | 7 | | |
| | 8 | | |
| | 9 | | |
| | 10 | | |
| | 11 | | |
| | 12 | | Reserve |
| | 13 | | Reserve |
| | 14 | | Reserve |
| | 15 | | |
| | 16 | | |
 : DEFINED BYTE
 : RESERVE BYTE
F I G. 4

ADM DEVICE AND SIGNAL TRANSMISSION METHOD

BACKGROUND OF THE INVENTION

1. Field of the Invention

The present invention relates to an ADM (Add Drop Multiplexing) system wherein ADM devices are connected by multistage connections with SONET (Synchronous Optical NETwork), SDH (Synchronous Digital Hierarchy) or Ethernet (registered trademark).

2. Description of the Related Art

Conventional ADM systems implementing SONET/SDH are relayed in multi-stages when hierarching storage stations or providing long-haul trunks. However, management operations are generated for every trunk segment when increasing or reducing path speed. In recent years, with the diffusion of corporate L2 services (service providing layer 2 connection between points) and ADSL, systems which transmit Ethernet (registered trademark) traffic using ADM systems are being constructed. Furthermore, with the future diffusion of FTTH (Fiber to the Home), the reception of Ethernet (registered trademark) traffic to ADM systems is expected to increase-drastically.

ADM systems are generally constructed by implementing SONET or SDH. Although SDH is described in order to simplify explanation, the same also applies to SONET.

Link capacity adjustment scheme (LCAS) function is a function which increases or reduces path speed. ADM systems which increase and reduce the speed of trunk path bands in conjunction with an opposing device using this LCAS function are also disclosed.

FIG. 1 is a diagram explaining the operating conditions of the LCAS function in conventional ADM systems.

In FIG. 1, Pattern 1 shows opposing Ethernet (registered trademark) signals when enclosed within a single segment; Pattern 2 shows a case wherein trunk a connection is made by Ethernet (registered trademark); and Pattern 3 shows a case wherein a trunk connection is made by SDH.

Of these three patterns, LCAS function operation within the ADM system is possible only in Pattern 1. In Pattern 1, the transmission of LCAS control information is performed within the ADM segment by transmitting/receiving control codes within an H4 byte area in the POH (Path Over Head).

In addition, in actual systems, many are constructed such that ADM systems are relayed in multi-stages as in Pattern 2 and Pattern 3 to transmit signals.

Furthermore, technologies which transmit working traffic using working channels and protection channels by the LCAS function if the ring network is normal and circumvents interference generation area in conjunction with the protection function if interference exists are disclosed (for example, refer to Japanese Patent Publication; Japanese Patent Laid-open Publication No. 2002-359627).

However, in the above Pattern 2, because POH is terminated within the ring in the Ethernet (registered trademark) interface which is connected by trunk connection, the H4 byte transmitted and received in the ADM segment cannot be relayed in the Ethernet (registered trademark) trunk connection segment (*1 in FIG. 1), and therefore, the LCAS function cannot be operated end-to-end simultaneously between plural ADM systems.

Furthermore, in Pattern 3, although an H4 byte is relayed in an SDH interface used in trunk connection, the LCAS function cannot be operated end-to-end because there is no system for monitoring and controlling the H4 byte.

The factors which make the LCAS function inoperable in Pattern 2 and Pattern 3 are as follows:

(1) H4 byte transmitted and received in ADM segments cannot be relayed to the trunk connection segments in the trunk-connected Ethernet (registered trademark) interface, and therefore, the LCAS function cannot be operated simultaneously between plural ADM systems.

(2) Although an H4 byte is relayed in an SDH interface, the LCAS function cannot be operated because there is no system for monitoring and controlling the H4 byte.

Therefore, when increasing and reducing the speed of the trunk path bands in Pattern 2 and Pattern 3, the operator must set paths by manual operation for each device and each segment, thereby exacerbating operation efficiency. This was also the cause of increase in operation costs.

SUMMARY OF THE INVENTION

An object of the present invention, which has been made with the foregoing circumstances in consideration, is to provide an ADM device and a signal transmission method which comprises a function for efficiently handling sharp variations in traffic, promotes work efficiency of transmission capacity increase/decrease speed within ADM systems, and actualizes the facilitation of management.

In order to resolve the foregoing issues, the present invention implements a structure such as the following:

In other words, according to one embodiment of the present invention, the ADM device of the present invention is an ADM device which is capable of performing LCAS functions, configures a first communication network, and is connected to another ADM device which is connected to a second communication network, comprising: a SONET or SDH interface for connecting to the aforementioned other ADM device by SONET or SDH connection; an H4 byte monitoring means for monitoring the H4 byte of POH in this SONET or SDH interface; a LCAS control information acquisition means for acquiring LCAS control information from the H4 byte monitored by the H4 byte monitoring means; and a LCAS control information transmission means for transmitting LCAS control information acquired by the LCAS control information acquisition means to the other ADM devices.

In addition, according to one embodiment of the present invention, the ADM device of the present invention is an ADM device which is capable of performing LCAS functions, configures a first communication network, and is connected to the aforementioned other ADM device which is connected to a second communication network, comprising: an Ethernet (registered trademark) interface for connecting to the other ADM device by Ethernet (registered trademark) connection; and a LCAS control information transfer means for transferring the LCAS control information to the other ADM device after LCAS control information within the H4 byte transmitted from the other ADM device is terminated in the Ethernet (registered trademark) interface.

Furthermore, in the ADM device of the present invention, it is preferable that the aforementioned LCAS control information includes starting point device ID for identifying the ADM device which is the starting point and ending point device ID for identifying the ADM device which is the ending point, out of the aforementioned ADM device and the other ADM devices which comprise the first network and the second network.

Still further, according to one embodiment of the present invention, the signal transmission method of the present invention is a signal transmission method implemented by an ADM device which is capable of performing LCAS functions, configures a first communication network, and is connected to the aforementioned other ADM device which is connected to a second communication network, for monitoring the H4 POH byte, acquiring LCAS control information from this monitored H4 byte, and transmitting the acquired LCAS control information to the aforementioned other ADM devices in a SDH interface for connecting to the other ADM device by SDH connection.

Still further, according to the present invention, the signal transmission-method of the present invention is a signal transmission method implemented by an ADM device which is capable of performing LCAS functions, configures a first communication network, and is connected to the aforementioned other ADM device which is connected to a second communication network, for transferring the aforementioned LCAS control information to the aforementioned other ADM device after the LCAS control information within the H4 byte transmitted from the other ADM device is terminated in the Ethernet (registered trademark) interface for connecting to the other ADM device by Ethernet (registered trademark) connection.

BRIEF DESCRIPTION OF THE DRAWINGS

FIG. 3 is a diagram showing a signal transmission processing sequence in the first embodiment and the second embodiment of the present invention;

FIG. 4 is a diagram showing the structure of an H4 byte;

DESCRIPTION OF THE PREFERRED EMBODIMENTS

Although application examples for a system implementing SDH are shown within the following explanation, SDH can be replaced with SONET, and the present invention can be applied in the same way.

One characteristic of the present invention is, in a multi-stage-connected ADM system which is constructed by connecting a first ADM device which configures a first communication network and a second ADM device which configures a second communication network to enable mutual communication, LCAS function is operated end-to-end during relay by SONET, SDH, or Ethernet (registered trademark) which connects these two networks.

In order to actualize this, the SDH (or SONET) interface of the ADM device which is capable of performing LCAS functions, configures a first communication network, and is connected to the aforementioned other ADM device which is connected to a second communication network, must have a function for monitoring H4 POH byte and acquiring LCAS control information. Through this, LCAS control information can be acquired in the SDH (or SONET) interface and the LCAS function can be performedwhen Ethernet (registered trademark)(as a first communication network) and SDH (as a second communication network) are opposing, or SDH (as a first communication network) and SDH (or SONET) (as a second communication network) are opposing. In this case, by comprising an ON/OFF function for the LCAS function in the SDH (or SONET) interface, it is possible to not operate the LCAS function when opposing conventional SDH (or SONET) interface.

In addition, by comprising a function for transmitting LCAS control information within the H4 byte, received from the other ADM device during multi-stage connection, to the Ethernet (registered trademark) multi-stage trunk-side after termination in the Ethernet (registered trademark) interface of the ADM device which is capable of performing LCAS functions, configures a first communication network, and is connected to the aforementioned other ADM device which is connected to a second communication network, LCAS function can be operated end-to-end during multi-stage relay by Ethernet (registered trademark).

Furthermore, by comprising a function for attaching the device IDs of the ADM devices of the starting point and the ending point within the LCAS control information and transmitting, each ADM device configuring the communication network can verify the starting point ADM device and the ending point ADM device during multi-stage connection, and the LCAS function can be operated end-to-end, including the ADM device to be trunked.

Hereinafter, embodiments according to the present invention are described based on the drawings.

Figure 1:
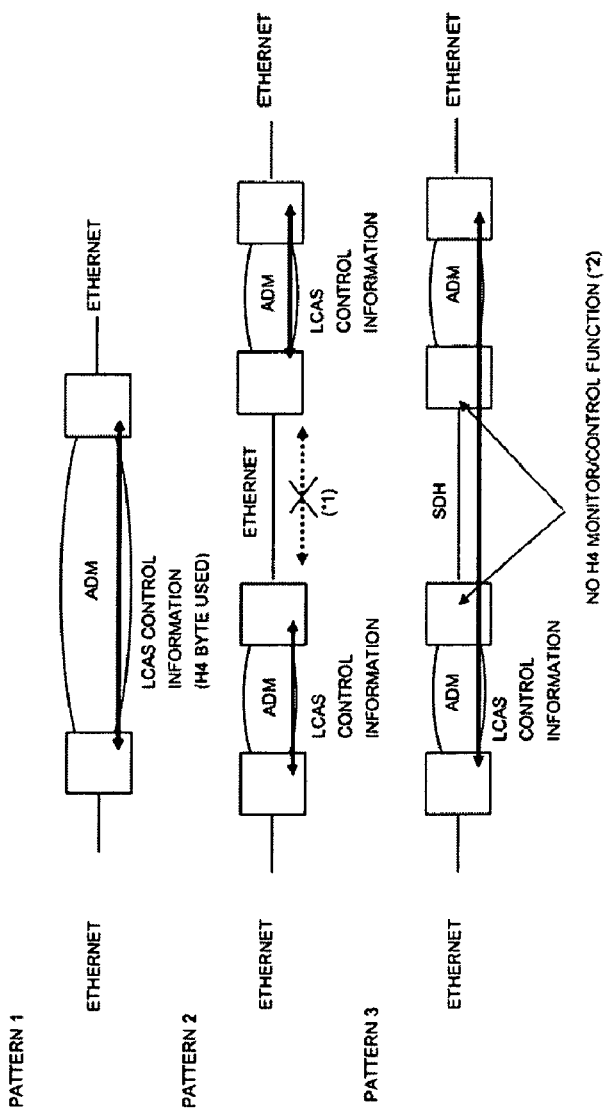
FIG. 1 is a diagram explaining the operating conditions of the LCAS function in a conventional ADM system.
Figure 2A:
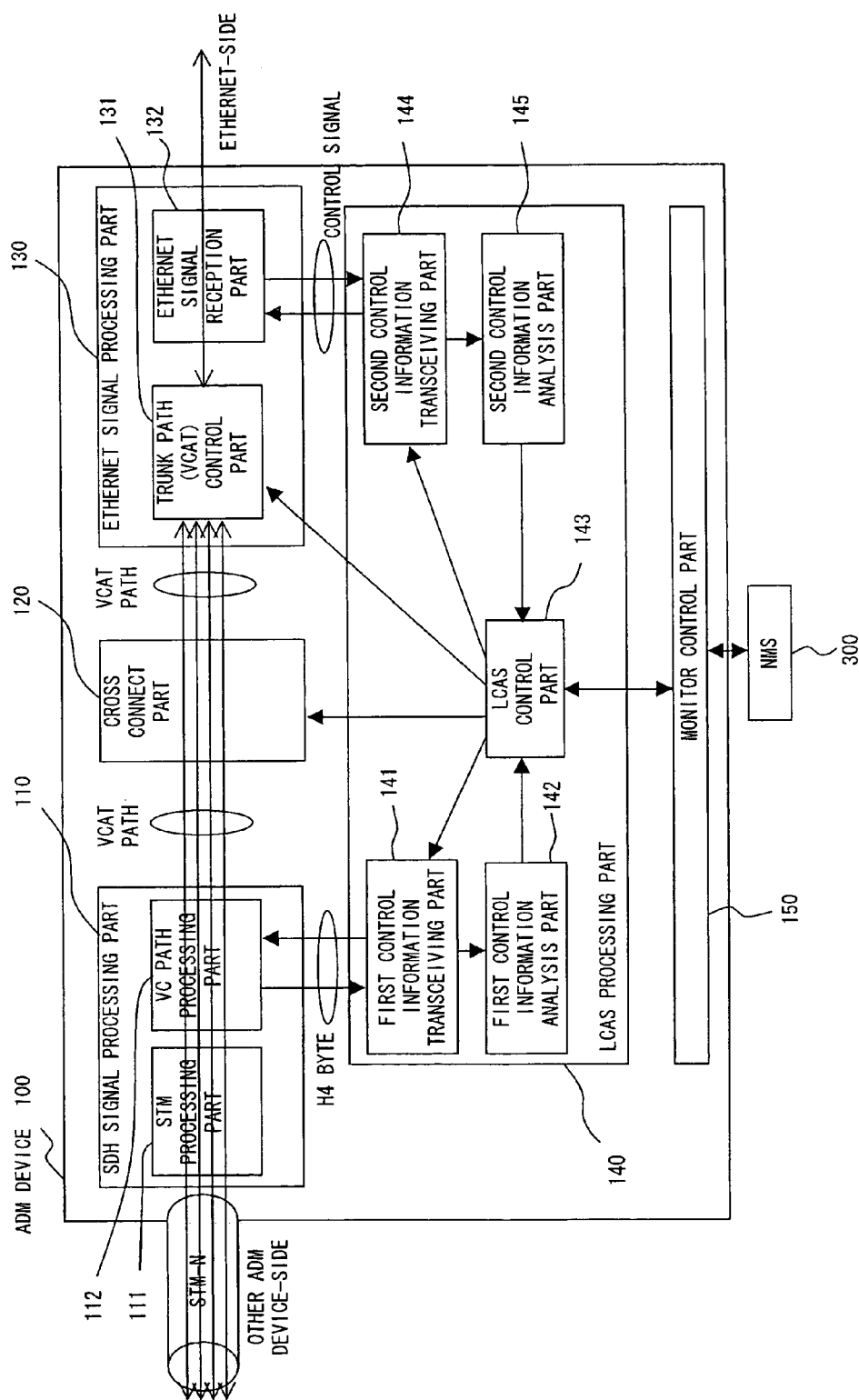
FIG. 2A is a diagram showing the configuration of an ADM system in a first embodiment of the present invention.

FIG. 2A is a diagram showing the configuration of an ADM system in a first embodiment of the present invention.

In FIG. 2A, an ADM device 100 comprises: a SDH signal processing part 110 comprising an STM processing part 111 and a VC path processing part 112; a cross connecting part 120; an Ethernet (registered trademark) signal processing part 130 comprising a trunk path (VCAT: Virtual Concatenation) control part 131 and an Ethernet (registered trademark) signal reception part 132; an LCAS processing part 140 comprising a first control information transceiving part 141, a first control information analysis part 142, an LCAS control part 143, a second control information transceiving part 144, and a second control information analysis part 145; and a monitor control part 150. Additionally, this ADM device 100 configures a communication network through connection with other ADM devices, and configures a multistage connection ADM system through connection with other communication networks by Ethernet (registered trademark) connection.

The first control information transceiving part 141 is provided with a function for receiving POH comprising H4 byte, which has been sent from the aforementioned other ADM device and transferred from the VC path processing part 112, and transferring this to the first control information analysis part 142 and a function for transferring POH comprising an H4 byte to the VC path processing part 112 according to instructions from the LCAS control part 143.

The first control information analysis part 140 is provided with a function for performing analysis to determine whether the device itself (ADM device 100) is the ending point ADM device or is an ADM which performs relay within the aforementioned ADM system, verify the modification speed of VCAT, and determine control content (path condition check (IDLE), path addition (ADD)) based on the LCAS control information within the H4 byte received from the aforementioned first control information transceiving part 141, and a function for transferring analyzed results to the LCAS control part 143.

The LCAS control part 143 is provided with a function for sending instructions to the cross connecting part 120 for controlling the path setting, to the trunk path (VCAT) control part 131 for controlling the path setting for, to the first control information transceiving part 141 for transmitting POH comprising H4 byte, and to the second control information transceiving part 144 for transmitting the LCAS control information, in adherence to the analysis results transferred from the first control information analysis part 140.

In addition, the LCAS control part 143 performs analysis of the starting point ADM device and the ending point ADM device and analysis of the changing communication speed according to control from network system management system 300, and at the same time, instructs the second control information transceiving part 144 to transmit LCAS control information based on the analyzed results.

The second control information transceiving part 144 is provided with a function for receiving LCAS control information received and transferred from the Ethernet (registered trademark)-side and transferring the information to the second control information analysis part 145 and a function for Ethernet (registered trademark) packetizing LCAS control information according to instructions from the LCAS control part 143 and transferring this to the Ethernet (registered trademark) signal transceiving part 132.

The second control information analysis part 145 is provided with a function for performing analysis to determine whether the device itself (ADM device 100) is the ending point ADM device or is an ADM which performs relay, verify the modification speed of VCAT, and determine control content (path condition check (IDLE), path addition (ADD)) based on the LCAS control information within the H4 byte received from the second control information transceiving part 144, and a function for transferring analyzed results to the LCAS control part 143.

Figure 2B:
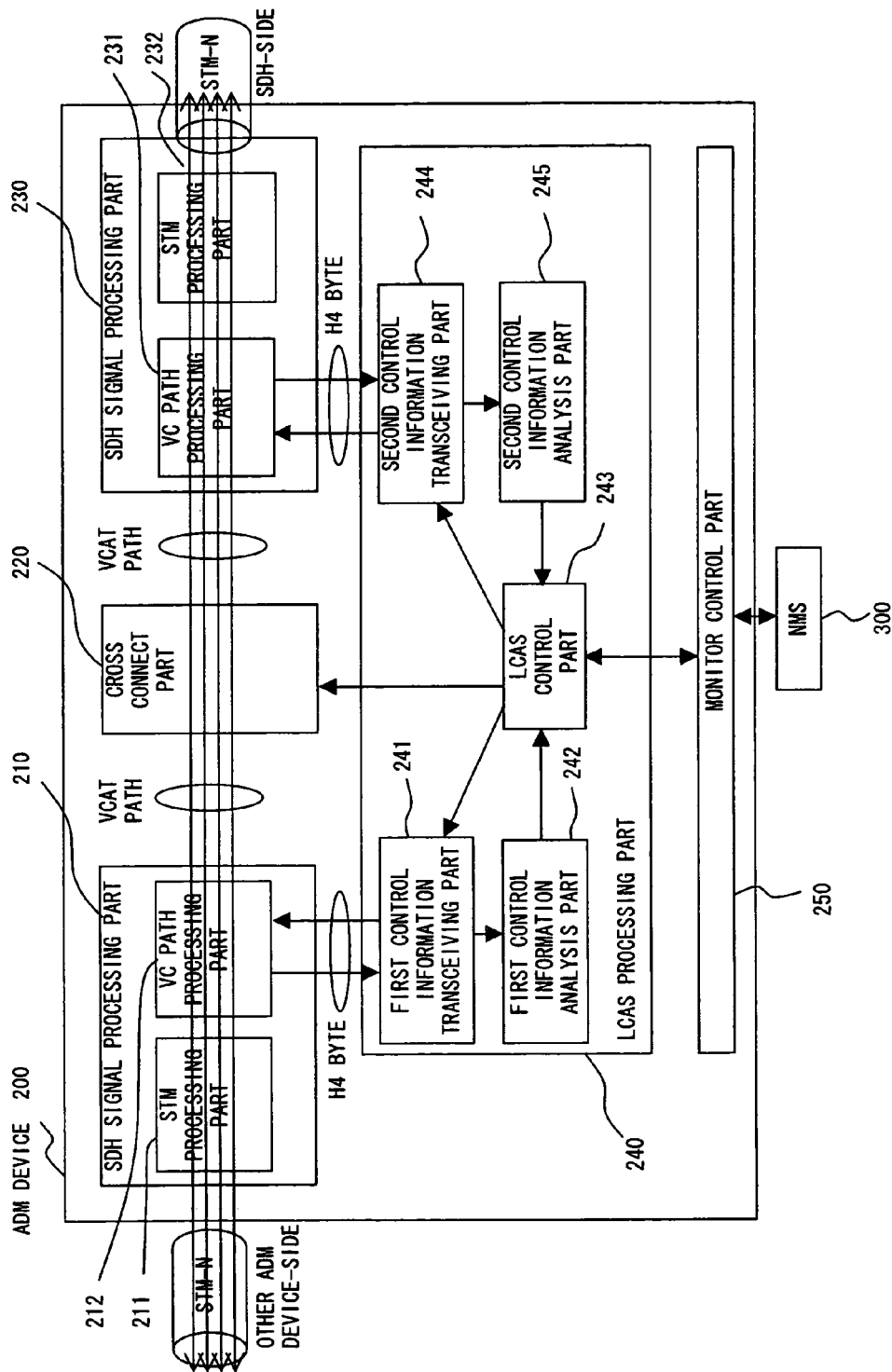
FIG. 2B is a diagram showing the configuration of an ADM system in a second embodiment of the present invention.

FIG. 2B is a diagram showing the configuration of an ADM system in a second embodiment of the present invention.

In FIG. 2B, the ADM device 200 comprises: an SDH signal processing part 210 comprising an STM processing part 211 and a VC path processing part 212; a cross connecting part 220; an SDH signal processing part 230 comprising a VC path processing part 231 and an STM processing part 232; an LCAS processing part 240 comprising a first control information transceiving part 241, a first control information analysis part 242, an LCAS control part 243, a second control information transceiving part 244, and a second control information analysis part 245; and a monitor control part 150. Additionally, this ADM device 200 configures a communication network through connection with other ADM devices, and configures a multistage connection ADM system through connection with other communication networks by SDH connection.

The first control information transceiving part 241 is provided with a function for receiving a POH comprising an H4 byte, which has been sent from the aforementioned other ADM device and transferred from the VC path processing part 212, and transferring this to the first control information analysis part 242 and a function for transferring a POH comprising an H4 byte to the VC path processing part 212 according to instructions from the LCAS control part 243.

The first control information analysis part 240 is provided with a function for performing analysis to determine whether the device itself (ADM device 200) is the ending point ADM device or is an ADM which performs relay within the aforementioned ADM system, verify the modification speed of VCAT, and determine control content (path condition check (IDLE), path addition (ADD)) based on the LCAS control information within the H4 byte received from the aforementioned first control information transceiving part 241, and a function for transferring analyzed results to the LCAS control part 243.

The LCAS control part 243 is provided with a function for sending instructions to the cross connecting part 220 for controlling the path-setting, to the first control information transceiving part 241 for transmitting a POH comprising an H4 byte, and to the second control information transceiving part 244 for transmitting a POH comprising an H4 byte, in adherence to the analysis results transferred from the first control information analysis part 240.

In addition, the LCAS control part 243 performs analysis of the starting point ADM device and the ending point ADM device and analysis of the changing communication speed according to control from network system management system 300, and at the same time, instructs the second control information transceiving part 244 to transmit LCAS control information based on the analyzed results.

The second control information transceiving part 244 is provided with a function for receiving a POH comprising an H4 byte received from the SDH-side and transferred from the VC path processing part 231 and transferring this to the second control information analysis part 245 and a function for transferring POH comprising an H4 byte to the VC path processing part 231 in adherence to instructions from the LCAS control part 243.

The second control information analysis part 245 is provided with a function for performing analysis to determine whether the device itself (ADM device 200) is the ending point ADM device or is an ADM which performs relay, verify the modification speed of VCAT, and determine control content (path condition check (IDLE), path addition (ADD)) based on the LCAS control information within the H4 byte received from the second control information transceiving part 244, and a function for transferring analyzed results to the LCAS control part 243.

Next, a signal transmission processing in an ADM system constructed by an ADM device 100 or ADM device 200, configured as described above, and the same ADM device is explained.

FIG. 3 is a diagram showing a signal transmission processing sequence in the first embodiment and the second embodiment of the present invention.

The ADM system described herein is constructed by ADM device 100 or ADM device 200 and the same ADM device as nodes 401, 402, 403, and 404. A first communication network formed by nodes 401 and 402 and a second network formed by nodes 403 and 404 are connected by Ethernet (registered trademark) connection or SDH connection, node 401 is the starting point ADM device and node 404 is the ending point ADM device.

First, through operation of the network management system (NMS) 300 by an operator, the speed change of node 401 is controlled in step S301. Information on the starting point and ending point of the path of which the speed will be changed and the communication speed to be changed is placed in this control information. Here, control information are starting point ID for identifying the starting point node 401=1, ending point ID for identifying the ending point node 404=4, and speed change: VC4-3V→VC4-7V.

Then, in step S302, node 401 which received control from the network management system (NMS) 300 analyzes the control content in LCAS control part 143 or 243.

Subsequently, in step S303, node 401 transmits the results of the analysis in step S302 to node 402, which forms the first network which node 401 by ADM connection, by inserting path verification information in an H4 byte. Starting point ID=1, ending point ID=4, speed change: VC4-3V→VC4-7V, which are information on the starting point and the ending point of the path of which the speed will be changed and the speed to be changed, are inserted in the path verification information. In addition, in step 304, the second control information transceiving part 144 of node 402 verifies path conditions (available space, existence of malfunction) to the cross connecting part 120 and trunk path (VCAT) control part 121.

Node 402, which has received an H4 byte from node 401, extracts path verification information (available space, existence of malfunction) in the first control information analysis part 142 or 242, analyzes the contents, and transmits the analysis results to LCAS 143 or 243, in step S305. Here, analysis results are verification instruction of path conditions, that it (node 402) is a trunk node, and that communication speed is changed from VC4-3V to VC4-7V. Then, in the LCAS control part 143 or 243 of node 402, path verification information to node 403 is relayed to the second control information transceiving part 144 or 244, according to the foregoing analysis results. In the LCAS control part 143 of node 402, according to the analysis results, instructions are given to packetize and transfer the information, and in the LCAS control part 243, instructions are given to transfer as an H4 byte. Furthermore, in the second control information transceiving part 144 or 244 of node 402, the transfer of path verification information (available space, existence of malfunction) to node 403 is performed.

Then, in step S306, the second control information transceiving part 144 of node 402 verifies the path conditions (available space, existence of malfunction) to the cross connecting part 120 and the trunk path (VCAT) control part 121.

Node 403, which has received an H4 byte from node 402 extracts path verification information (available space, existence of malfunction) in the second control information analysis part 145 or 245, analyzes the contents, and transmits the analysis results to LCAS 143 or 243, in step S307. Here, analysis results are verification instruction of path conditions, that it (node 403) is a trunk node, and that communication speed is changed from VC4-3V to VC4-7V. Then, in the LCAS control part 143 or 243 of node 403, path verification information to node 404 is relayed to the first control information transceiving part 141 or 241, according to the foregoing analysis results. In the LCAS control part 243, instructions are given to transfer as an H4 byte. Furthermore, in the first control information transceiving part 141 or 241 of node 403, the transfer of path verification information (available space, existence of malfunction) to node 404 is performed.

Then in step S308, the second control information transceiving part 144 of node 403 verifies the path conditions (available space, existence of malfunction) to the cross connecting part 120 and the trunk path (VCAT) control part 121.

Node 404, which has received an H4 byte from node 403 extracts path verification information (available space, existence of malfunction) in the second control information analysis part 145 or 245, analyzes the contents, and transmits the analysis results to LCAS 143 or 243, in step S309. Here, analysis results are verification instruction of path conditions, that it (node 404) is a trunk node, and that communication speed is changed from VC4-3V to VC4-7V. Then, in the LCAS control part 143 or 243 of node 404, path verification information to node 403 is relayed to the first control information transceiving part 141 or 241, according to the foregoing analysis results. In addition, the LCAS control part 143 or 243 of node 404 instructs the first control information transceiving part 141 or 241 to transmit the verified path condition results. In the LCAS control part 243, instructions are given to transfer as an H4 byte.

Then in step S310, the second control information transceiving part 144 of node 404 verifies the path conditions (available space, existence of malfunction) to the cross connecting part 120 and the trunk path (VCAT) control part 121.

Next, in step S311, verification results of the path conditions are transferred to node 403 in the first control information transceiving part 141 or 241 of node 403.

Node 403, which has received an H4 byte from node 404, adds the verification results of its own (node 403) path condition to the received verification results and transfers this to node 403. In the LCAS control part 143 of node 404, according to the verification results, instructions are given to packetize and transfer the information, and in the LCAS control part 243, instructions are given to transfer as an H4 byte.

Node 402, which has received H4 byte or the packet from node 403 adds the verification results of its own (node 402) path condition to the received verification results and transfers this to node 401.

Node 401, which has received an H4 byte from node 402, extracts path verification information in the first control information transceiving part 141 or 241, transfers this to the first control information analysis part 142 or 242. The first control information analysis part 142 or 242 verifies the path conditions of each node (nodes 402, 403, and 404) and determines whether these are normal or not, in step S314.

Then, if the determination result from the first control information analysis part 142 or 242 of node 401 is "normal", in step S315, the LCAS control part 143 or 243 of node 401 instructs the first control information transceiving part 141 or 242 to place path setting information in an H4 byte and transmit this to node 402. Starting point ID=1, ending point ID=4, speed change: VC4-3V→VC4-7V, which are information on the starting point and the ending point of the path of which the speed will be changed and the speed to be changed, are inserted in the path verification information.

Node 402, which has received an H4 byte from node 401, extracts path setting information in the first control information analysis part 142 or 242, analyzes the contents, and transmits the analysis results to LCAS 143 or 243, in step S317. Here, analysis results disclose setting instruction of path conditions, that it (node 402) is a trunk node, and that communication speed is changed from VC4-3V to VC4-7V. Then, in the LCAS control part 143 or 243 of node 402, path setting information to node 403 is relayed to the second control information transceiving part 144 or 244, according to the foregoing analysis results. In the LCAS control part 143 of node 402, according to the analysis results, instructions are given, for example, to packetize and transfer the information, and in the LCAS control part 243, instructions are given to transfer as H4 byte. Furthermore, in the second control information transceiving part 144 or 244 of node 402, the transfer of path setting information to node 403 is performed.

Then, in set S318, the LCAS control part 143 or 243 of node 402 changes the communication speed from VC4-3V to VC4-7V.

Node 403, which has received H4 byte from node 402, extracts path setting information in the second control information analysis part 145 or 245, analyzes the contents, and transmits the analysis results to LCAS 143 or 243, in step S319. Here, analysis results disclose setting instruction of path conditions, that it (node 403) is a trunk node, and that communication speed is changed from VC4-3V to VC4-7V. Then, in the LCAS control part 143 or 243 of node 403, path setting information to node 403 is inserted, and subsequently relayed to the first control information transceiving part 141 or 241.

Then, in step S320, the LCAS control part 143 or 243 of node 403 changes the communication speed from VC4-3V to VC4-7V.

Next, in step S321, node 404 which has received H4 byte from node 403 extracts path setting information in the first control information analysis part 142 or 242, analyzes the contents. The analysis results are transmitted to LCAS 143 or 243. Here, analysis results disclose setting instruction of path conditions, that it (node 404) is a trunk node, and that communication speed is changed from VC4-3V to VC4-7V. In addition, instructions are given to instruct path setting to the cross connecting part 120 and the trunk path (VCAT) control part 131 according to the analysis results.

Then, in step S322, the LCAS control part 143 or 243 of node 404 changes the communication speed from VC4-3V to VC4-7V.

Furthermore, after completing path setting, the LCS control part 143 or 243 of node 404 instructs the transmission of the results to the first control information transceiving part 141 or 241, and in step S323, the first control information transceiving part 141 or 241 inserts the results of path setting completion to an H4 byte and transfers this to node 403.

Node 403, which has received an H4 byte from node 404, adds the results of its own (node 403) path setting completion to the received H4 byte and transfers this to node 402. The LCAS control part 143 or 243 of node 403, for example, packetizes this information and transfers, and the LCAS control part 243 it is transferred as an H4 byte.

Node 402, which has received an H4 byte or packet from node 403 adds the results of its own (node 402) path setting completion to the received H4 byte and transfers this to node 401, in step S325.

Then, in step S326, node 401 which has received an H4 byte from node 402, extracts path setting completion results in the first control information transceiving part 141 or 241, transfers this to the first control information analysis part 142 or 242. The first control information analysis part 142 or 242 verifies the path setting results from each node (nodes 402, 403, and 404) and determines whether or not it has been completed normally.

Lastly, in step S327, after the LCAS control part of node 401 notifies the monitor control part 250 of the determination results from the first control information analysis part 142 or 242, the monitor control part 250 of node 401 notifies the network management system (NMS) 300 of the path change results.

FIG. 4 is a diagram showing the structure of an H4 byte.

As shown in FIG. 4, the H4 byte explained herein in the first embodiment and the second embodiment has a Reserve bit. Information indicating the device ID for identifying ADM device 100, 200 or nodes 401, 402, 403, and 404 in the first embodiment and the second embodiment, information for differentiating trunk nodes, and information for differentiating ending point node are transferred using this Reserve bit.

Although the embodiments of the present invention have been explained above, with reference to the drawings, the ADM device to which the present invention is applied is not limited to the foregoing embodiments if its functions are being performed. It goes without saying that this can be a single device, a system or an integrated device formed by a plurality of devices, or a system wherein processing is performed via networks such as LAN and WAN.

Figure 5:
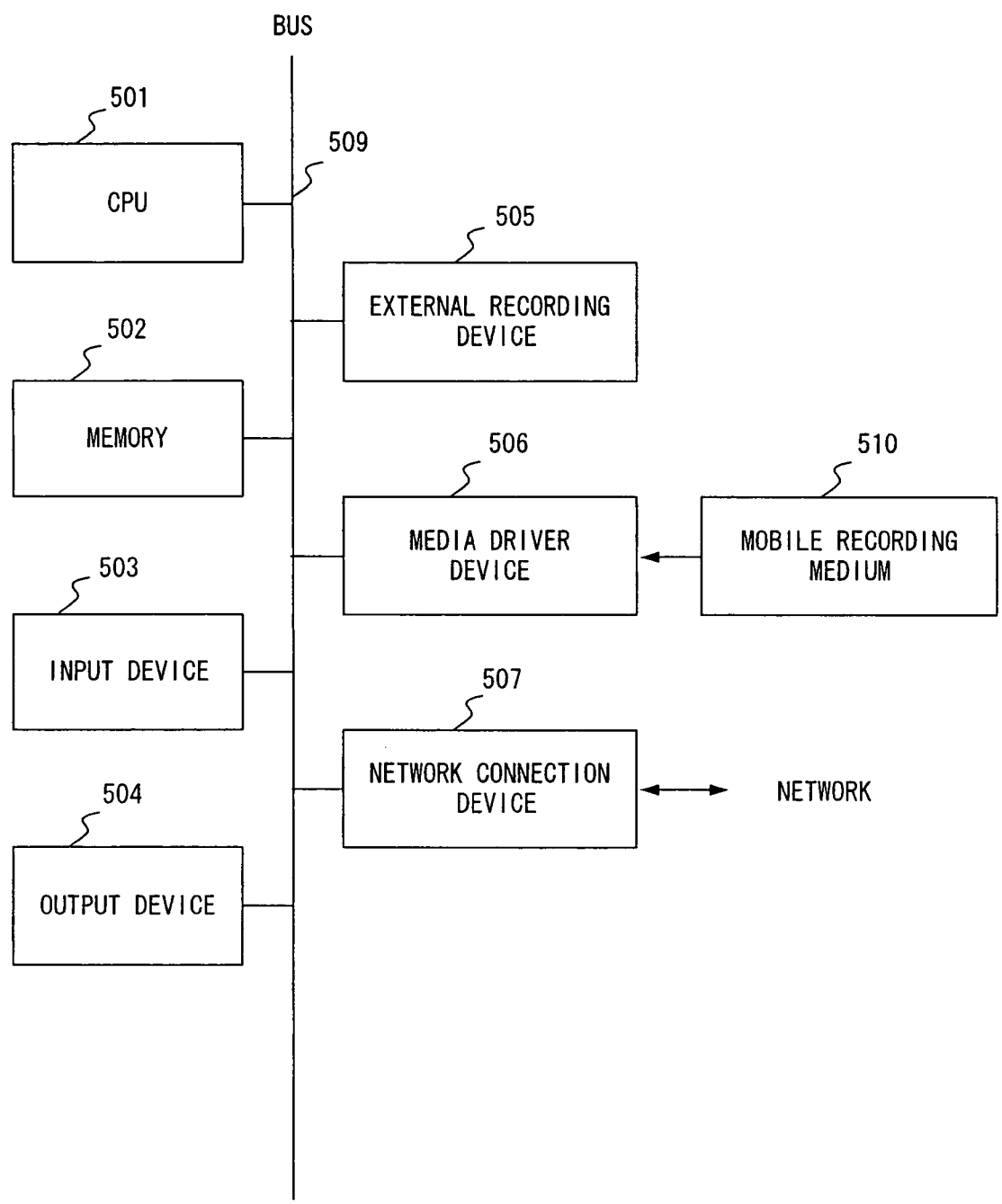
FIG. 5 is a diagram showing the construction of an ADM device of the present invention.

In addition, as shown in FIG. 5, this can be realized in a system comprising; a CPU 501 connected to bus 509; ROM or RAM memory 501; input device 503; output device 504; external recording device 505; media driver device 506; mobile recording medium 510; and network connection device 507. In other words, it goes without saying that this can be achieved by providing a ROM or RAM memory 502 to which a software program code for realizing the system of the foregoing embodiments is recorded, external recording device 505, and a mobile recording medium 510 to the ADM device, and the computer of this ADM device reading and executing the program code.

In this case, the program code read from the mobile recording medium 510 or the like per se actualizes the new functions of the present invention, and the mobile recording medium 510 to which the program code is recorded achieves the present invention.

As mobile recording medium 510 for providing the program code, flexible disks, hard disks, optical disks, magnet-optical disks, CD-ROM, CD-R, DVD-ROM, DVD-RAM, magnetic tape, nonvolatile memory card, and various recording media recorded via a network connection device 507 (in other words, communication circuit) such as E-mail and online communication can be used.

Figure 6:
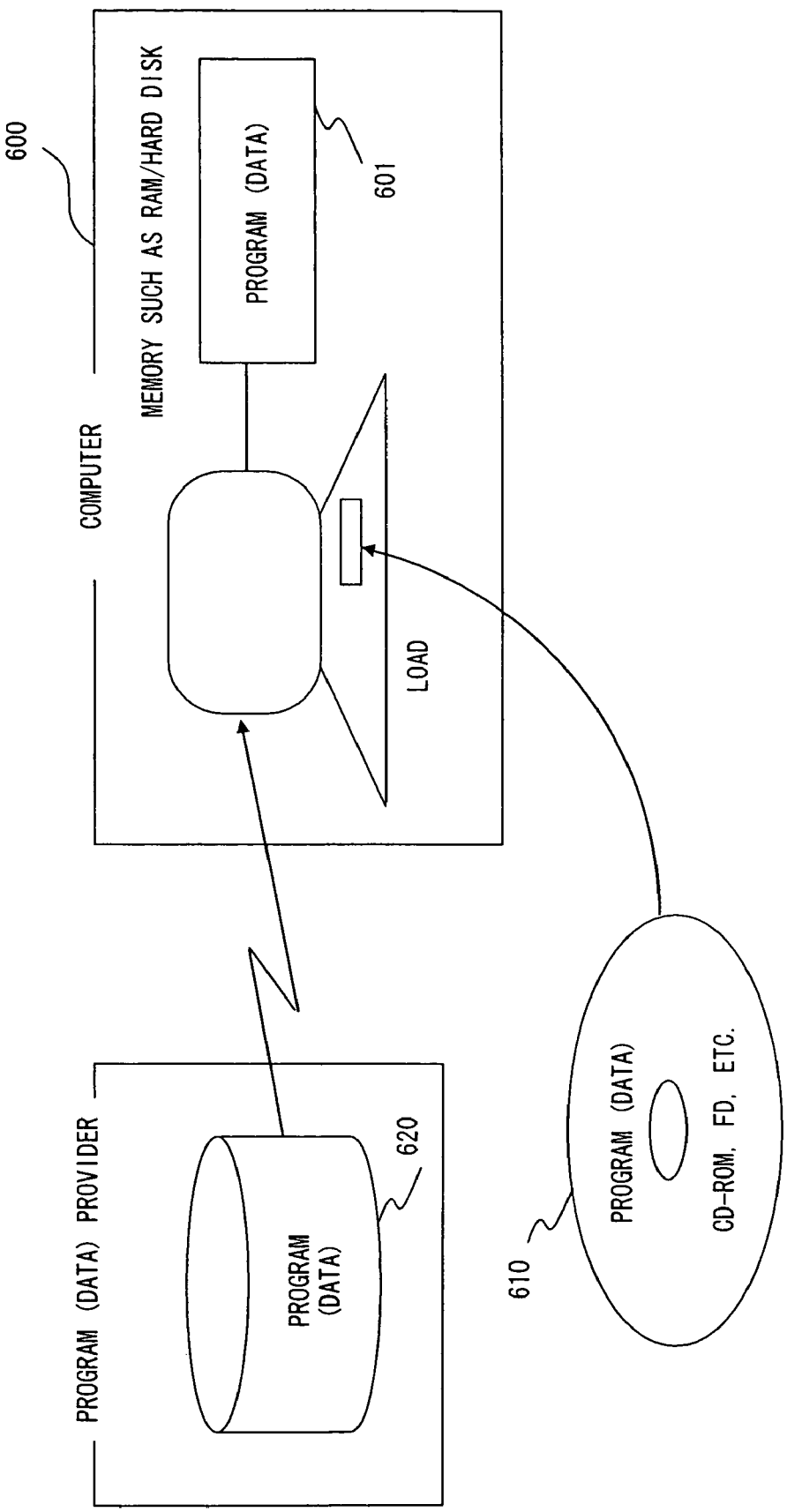
FIG. 6 is a diagram explaining the loading of a signal transmission program to a computer in the present invention.

In addition, as shown in FIG. 6, when a computer (information processing device) 600 executes the program code read to memory 601, not only are the functions of the foregoing embodiments actualized, but based on the instructions of this program code, the OS running on the computer 600 performs a part of or the entire actual processing, and the functions of the foregoing embodiments are actualized through this processing as well.

Furthermore, after the program (data) 620 provided by the program code read from a mobile recording medium 610 or the program (data) provider is written to memory 602 provided in the function enhancement board inserted into computer 600 or the function enhancement connected to the computer 600, based on the instructions of this program code, the CPU provided in this function enhancement board or function enhancement unit performs a part of or the entire processing, and the functions of the foregoing embodiments are actualized through this processing as well.

According to the present invention, even if the construction of the ADM system becomes complex, end-to-end path management can be facilitated.

In addition, according to the present invention, because increasing and decreasing speed of trunk path bands spanning a plurality of systems can be performed with one operation, operation efficiency can be improved significantly.

Furthermore, according to the present invention, because the LCAS function is possible even during multistage connection by SONET or SDH, segments which conventionally had been connected in multi-stages by Ethernet (registered trademark) can be SONET or SDH-compliant, thereby reducing delays and enhancing reliability.

What is claimed is:

1. An ADM (Add Drop Multiplexing) device which is capable of performing LCAS (Link Capacity Adjustment Scheme) functions, configures a first communication network, and is connected to another ADM device which is connected to a second communication network, the ADM device comprising:

a SONET or SDH interface to connect to the other ADM device by SONET or SDH connection;

an H4 byte monitoring unit to monitor a H4 byte of POH (Path Over Head) in the SONET or SDH interface;

a control information analysis unit to determine whether the ADM device itself is an ADM device which performs relay or an ending point ADM device based on information indicating the ending point ADM device included in LCAS (Link Capacity Adjustment Scheme) control information within the H4 byte;

an LCAS control information transmission unit to transmit LCAS control information to the other ADM devices when the device itself is determined to be the ADM device which performs relay by the control information analysis unit.

2. The ADM device according to claim 1, further comprising:
an on/off unit to control on/off of the transmission of said LCAS control information by said LCAS control information transmitting unit.

3. An ADM (Add Drop Multiplexing) device which is capable of performing LCAS (Link Capacity Adjustment Scheme) functions, configures a first communication network, and is connected to another ADM device which is connected to a second communication network, comprising:
a SONET or SDH interface to connect to the another ADM device by SONET or SDH connection;
an H4 byte monitoring unit to monitor the H4 byte of POH (Path Over Head) in the SONET or SDH interface;
an LCAS control information acquisition unit to acquire LCAS control information from the H4 byte monitored by the H4 byte monitoring unit; and
an LCAS control information transmission unit to transmit LCAS control information acquired by the LCAS control information acquisition unit to the other ADM devices;
wherein said LCAS control information includes a starting point device ID for identifying the ADM device which is the starting point, and an ending point device ID for identifying the ADM device which is the ending point, out of said ADM device and other ADM devices included in said first network and said second network.

4. An ADM (Add Drop Multiplexing) device which is capable of performing LCAS functions, configures a first communication network, and is connected to another ADM device which is connected to Ethernet, comprising:
a SONET or SDH interface to connecting to an ADM device by SONET or SDH connection;
an Ethernet interface to connect to the other ADM device by an Ethernet connection; and
an H4 byte monitoring unit to monitor an H4 byte of POH (Path Over Head) received in the SONET or SDH interface;
an control information analysis unit to determine whether the device itself is an ADM device which performs relay or an ending point ADM device based on information indicating the ending noint ADM device included in LCAS (Link Capacity Adjustment Scheme) control information within the H4 byte;
an LCAS control information transfer unit to convert said LCAS control information to an Ethernet packet and transfer the Ethernet packet to the other ADM device connected by Ethernet connection when the device itself is determined to be the ADM device which performs relay as determined by the control information analysis unit.

5. The ADM device according to claim 4 wherein said LCAS control information includes a starting point device ID for identifying the ADM device which is the starting point, and an ending point device ID for identifying the ADM device which is the ending point.

6. A signal transmission method implemented by an ADM (Add Drop Multiplexing) device which is capable of performing LCAS functions, configures a first communication network, and is connected to another ADM device which is connected to a second communication network, the method comprising:
monitoring an H4 byte of POH (Path Over Head) in a SDH interface for connecting to the other ADM device by SDH connection;
determining whether the ADM device is an ADM device which performs relay or an ending point ADM device based on information indicating the ending point ADM device included in LCAS (Link Capacity Adjustment Scheme) control information within the H4 byte; and
transmitting the LCAS control information to the other ADM device when the ADM device is determined to be the ADM device which performs relay.

7. A signal transmission method implemented by an ADM (Add Drop Multiplexing) device which is capable of performing LCAS functions, configures a first communication network, and is connected to the another ADM device which is connected to Ethernet, the method comprising:
monitoring an H4 byte of POH (Path Over Head) received through SONET or SDH connection;
determining whether the ADM device is an ADM device which performs relay or an ending point ADM device based on information indicating the ending point ADM device included in LCAS (Link Capacity Adjustment Scheme) control information within the H4 byte;
converting said LCAS control information to an Ethernet packet; and
transferring the Ethernet packet to the other ADM device connected by Ethernet connection.

8. An ADM (Add Drop Multiplexing) device which is capable of performing LCAS (Link Capacity Adjustment Scheme) functions, configures a first communication network, and is connected to another ADM device which is connected to a second communication network, the ADM device comprising:
a SONET or SDH interface to connect to the other ADM device by SONET or SDH connection;
an H4 byte monitoring means for monitoring an H4 byte of POH (Path Over Head) in the SONET or SDH interface;
an control information analysis means for determining whether the device itself is an ADM device which performs relay or an ending point ADM device based on information indicating the ending point ADM device included in LCAS (Link Capacity Adjustment Scheme) control information within the H4 byte; and
an LCAS control information transmission means for transmitting LCAS control information to the other ADM device when the device itself is determined to be the ADM device which performs relay by the control information analysis means.

9. An ADM (Add Drop Multiplexing) device which is capable of performing LCAS functions, configures a first communication network, and is connected to another ADM device which is connected to Ethernet, comprising:
a SONET or SDH interface for connecting to an ADM device by SONET or SDH connection;
an Ethernet interface to connect to the other ADM device by Ethernet connection; and
an H4 byte monitoring means monitoring an H4 byte of POH (Path Over Head) in the SONET or SDH interface;
an control information analysis means determining whether the device itself is an ADM device which performs relay or an ending point ADM device based on information indicating the ending point ADM device included in LCAS (Link Capacity Adjustment Scheme) control information within the H4 byte;
an LCAS control information transfer means for transferring said LCAS control information to the other ADM device connected to Ethernet when the device itself is determined to be the ADM device which performs relay.

* * * * *